US 12,106,906 B2

(12) United States Patent
Kamo et al.

(10) Patent No.: US 12,106,906 B2
(45) Date of Patent: Oct. 1, 2024

(54) HIGH VOLTAGE FEED-THROUGH CAPACITOR

(71) Applicant: TDK CORPORATION, Tokyo (JP)

(72) Inventors: Yuta Kamo, Tokyo (JP); Hisashi Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 146 days.

(21) Appl. No.: 17/860,334

(22) Filed: Jul. 8, 2022

(65) Prior Publication Data

US 2023/0023226 A1 Jan. 26, 2023

(30) Foreign Application Priority Data

Jul. 21, 2021 (JP) .................................. 2021-120351

(51) Int. Cl.
  *H01G 4/35* (2006.01)
  *H01G 4/012* (2006.01)
  *H01G 4/12* (2006.01)
  *H01G 4/224* (2006.01)
  *H01G 4/228* (2006.01)

(52) U.S. Cl.
  CPC .............. *H01G 4/35* (2013.01); *H01G 4/012* (2013.01); *H01G 4/12* (2013.01); *H01G 4/224* (2013.01); *H01G 4/228* (2013.01)

(58) Field of Classification Search
  CPC ............ H01G 4/35; H01G 4/30; H01G 4/012; H01G 4/224; H01G 4/228

USPC ...................................... 361/302, 301.4, 311
  See application file for complete search history.

(56) References Cited

U.S. PATENT DOCUMENTS

| 4,811,161 | A | * | 3/1989 | Sasaki | ..................... | H01G 4/224 |
| | | | | | | 361/302 |
| 5,544,002 | A | * | 8/1996 | Iwaya | ...................... | H01G 4/35 |
| | | | | | | 361/302 |
| 5,729,425 | A | * | 3/1998 | Fujiwara | .................. | H01G 4/35 |
| | | | | | | 361/328 |
| 2001/0036053 | A1 | | 11/2001 | Asada et al. | | |
| 2005/0073799 | A1 | * | 4/2005 | Sato | ......................... | H01G 4/35 |
| | | | | | | 361/302 |

FOREIGN PATENT DOCUMENTS

JP 2001-351830 A 12/2001

* cited by examiner

*Primary Examiner* — Arun Ramaswamy
(74) *Attorney, Agent, or Firm* — Oliff PLC (57) ABSTRACT

The high voltage feed-through capacitor comprises a feed-through capacitor unit, a resin coating the feed-through capacitor unit, and a bond structure between the feed-through capacitor unit and the resin. The feed-through capacitor unit includes an element body including first and second principal surfaces opposing each other, a first electrode on the first principal surface, a second electrode on the second principal surface, a through conductor electrically connected to the first electrode, and a terminal conductor electrically connected to the second electrode. The bond structure chemically bonds a first surface of the feed-through capacitor unit and a second surface of the resin.

18 Claims, 5 Drawing Sheets

*Fig.5*

HIGH VOLTAGE FEED-THROUGH CAPACITOR

BACKGROUND OF THE INVENTION

Field of the Invention

The present invention relates to a high voltage feed-through capacitor.

Description of Related Art

Known high voltage feed-through capacitors include a feed-through capacitor unit and a resin coating the feed-through capacitor unit (for example, refer to Japanese Unexamined Patent Publication No. 2001-351830). The feed-through capacitor unit includes an element body, first and second electrodes, a through conductor, and a terminal conductor. The element body includes first and second principal surfaces opposing each other. A through hole is formed in the element body to be open at the first and second principal surfaces. The first electrode is disposed on the first principal surface, and the second electrode is disposed on the second principal surface. The through conductor is inserted through the through hole and is electrically connected to the first electrode. The terminal conductor is electrically connected to the second electrode. The high voltage feed-through capacitor is connected to, for example, a magnetron provided in a microwave oven. The high voltage feed-through capacitor connected to the magnetron prevents unnecessary radiation noise caused in the magnetron.

SUMMARY OF THE INVENTION

An object of an aspect of the present invention is to provide a high voltage feed-through capacitor having even higher reliability.

The present inventors conducted thorough research on a high voltage feed-through capacitor having even higher reliability. As a result, the present inventors newly obtained the following findings, and have accomplished the present invention.

The resin coats the feed-through capacitor unit and is bonded to the feed-through capacitor unit. In the configuration in which the feed-through capacitor unit and the resin are strongly bonded to each other, a gap tends not to be formed between the feed-through capacitor unit and the resin. In this case, partial discharge due to the gap tends not to occur. In the above configuration, discharge along the surface of the feed-through capacitor unit, so-called creeping discharge, also tends not to occur. Therefore, the high voltage feed-through capacitor including the above configuration tends not to generate discharge and has further improved reliability.

A high voltage feed-through capacitor according to one aspect comprises a feed-through capacitor unit, a resin coating the feed-through capacitor unit, and a bond structure between the feed-through capacitor unit and the resin. The feed-through capacitor unit includes an element body, first and second electrodes, a through conductor, and a terminal conductor. The element body includes first and second principal surfaces opposing each other. In the element body, a through hole is formed in the element body to be open at the first and second principal surfaces. The first electrode is disposed on the first principal surface, and the second electrode is disposed on the second principal surface. The through conductor is inserted through the through hole and is electrically connected to the first electrode. The terminal conductor is electrically connected to the second electrode. The bond structure chemically bonds a first surface of the feed-through capacitor unit and a second surface of the resin.

In the one aspect, the bond structure chemically bonds the first surface of the feed-through capacitor unit and the second surface of the resin. The chemical bond in the bond structure is stronger than, for example, the physical bond between the first surface and the second surface. The physical bond is realized, for example, through an anchor effect due to roughness of the first surface. Therefore, the one aspect certainly realizes a strong bond between the feed-through capacitor unit and the resin.

In the one aspect described above, the first surface may include an inner wall surface included in the element body and defining the through hole. In this case, the bond structure may chemically bond the inner wall surface and the second surface. The configuration in which the bond structure chemically bonds the inner wall surface and the second surface enhances the bond between the inner wall surface and the second surface. Therefore, this configuration certainly realizes a strong bond between the inner wall surface and the resin.

In the one aspect, the feed-through capacitor unit may include a coating material coating the through conductor and having an electrical insulation property. The first surface may include an outer surface of the coating material. The bond structure may chemically bond the outer surface and the second surface. The configuration in which the bond structure chemically bonds the outer surface and the second surface enhances the bond between the outer surface and the second surface. Therefore, this configuration certainly realizes a strong bond between the outer surface and the resin.

In the one aspect, the first surface may include a conductor surface of the terminal conductor. In this case, the bond structure may chemically bond the conductor surface and the second surface. The configuration in which the bond structure chemically bonds the conductor surface and the second surface enhances the bond between the conductor surface and the second surface. Therefore, this configuration certainly realizes a strong bond between the conductor surface and the resin.

In the one aspect, the first electrode may include a pair of conductors separated from each other on the first principal surface. In the element body, a groove may be formed between the pair of conductors. The first surface may include a wall surface included in the element body and defining the groove. The bond structure may chemically bond the wall surface and the second surface. The configuration in which the bond structure chemically bonds the wall surface and the second surface enhances the bond between the wall surface and the second surface. Therefore, this configuration certainly realizes a strong bond between the wall surface and the resin.

In the one aspect, the bond structure may chemically bond the first surface and the second surface via a silicon atom derived from a silane coupling agent. In the configuration in which the silicon atom derived from a silane coupling agent chemically bonds the first surface and the second surface, the bond between the first surface and the second surface includes, for example, a covalent bond via the silicon atom. Therefore, this configuration certainly realizes a strong bond between the feed-through capacitor unit and the resin.

In the one aspect, the silane coupling agent may include at least one of a silane coupling agent applied to the first surface or a silane coupling agent mixed into the resin. In the configuration in which the silane coupling agent includes at least one of the silane coupling agent applied to the first surface or the silane coupling agent mixed into the resin, the silicon atom derived from the silane coupling agent certainly chemically bonds the first surface and the second surface. Therefore, this configuration even more certainly realizes a strong bond between the feed-through capacitor unit and the resin.

In the one aspect, the bond structure may chemically bond the first surface and the second surface via a phosphorus atom derived from a phosphonic acid derivative. In the configuration in which the phosphorus atom derived from a phosphonic acid derivative chemically bonds the first surface and the second surface, the bond between the first surface and the second surface includes, for example, a covalent bond via the phosphorus atom. Therefore, this configuration more certainly realizes a strong bond between the feed-through capacitor unit and the resin.

In the one aspect, the phosphonic acid derivative may include at least one of a phosphonic acid derivative applied to the first surface or a phosphonic acid derivative mixed into the resin. In the configuration in which the phosphonic acid derivative includes at least one of a phosphonic acid derivative applied to the first surface or a phosphonic acid derivative mixed into the resin, the phosphorus atom derived from the phosphonic acid derivative certainly chemically bonds the first surface and the second surface. Therefore, this configuration even more certainly realizes a strong bond between the feed-through capacitor unit and the resin.

In the one aspect, the bond structure may chemically bond the first surface and the second surface via a central metal atom derived from a chelate complex. In the configuration in which the central metal atom derived from a chelate complex chemically bonds the first surface and the second surface, the bond between the first surface and the second surface includes, for example, a covalent bond via the central metal atom. Therefore, this configuration more certainly realizes a strong bond between the feed-through capacitor unit and the resin.

In the one aspect, the chelate complex may include at least one of a chelate complex applied to the first surface or a chelate complex mixed into the resin. In the configuration in which the chelate complex includes at least one of a chelate complex applied to the first surface or a chelate complex mixed into the resin, the central metal atom certainly chemically bonds the first surface and the second surface. Therefore, this configuration even more certainly realizes a strong bond between the feed-through capacitor unit and the resin.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

DETAILED DESCRIPTION OF EMBODIMENTS

Hereinafter, embodiments of the present invention will be described in detail with reference to the accompanying drawings. In the following description, the same elements or elements having the same functions are denoted with the same reference numerals and overlapped explanation is omitted.

Figure 1:
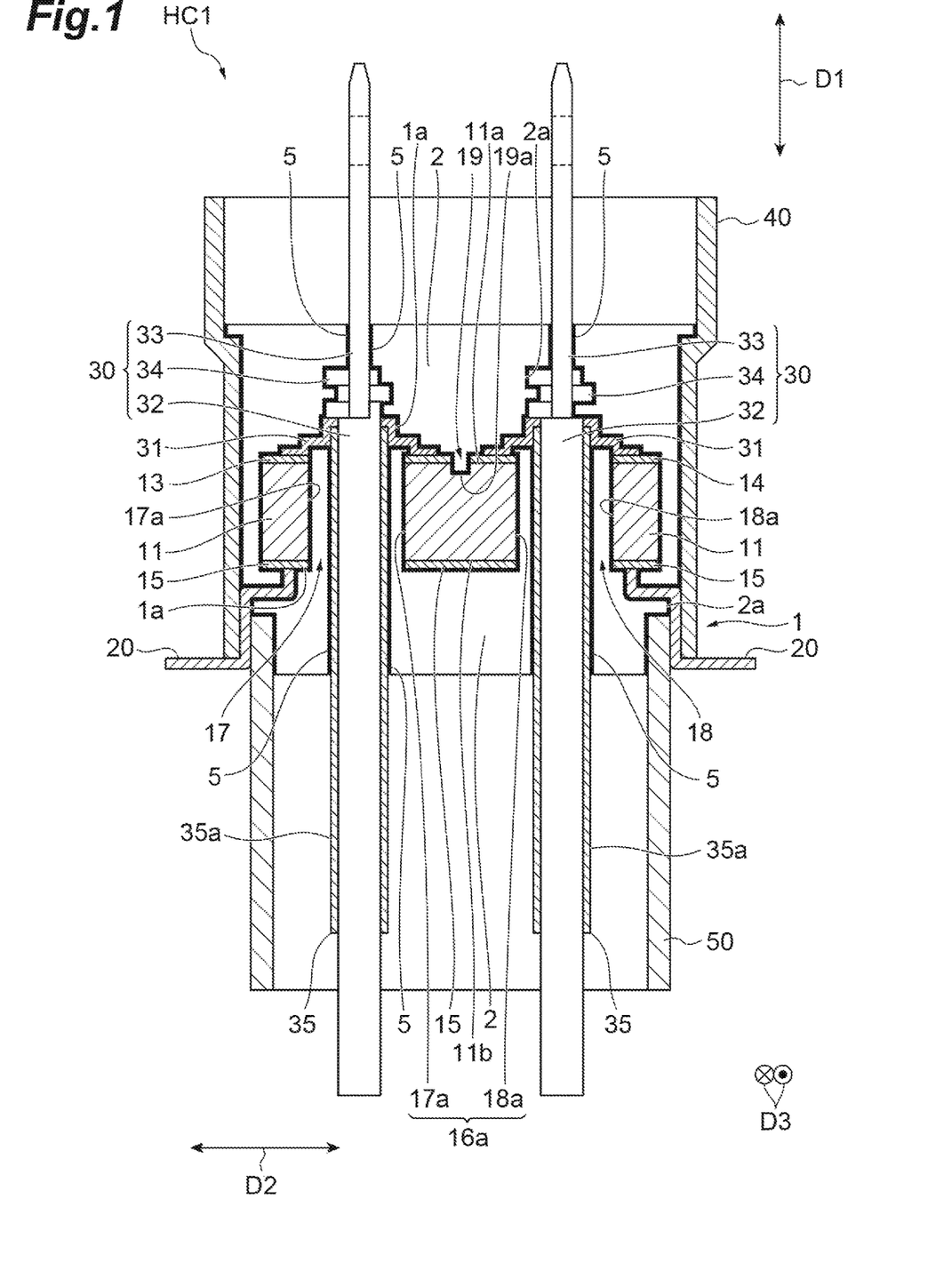
FIG. 1 is a cross-sectional view illustrating a high voltage feed-through capacitor according to one embodiment.
Figure 2:
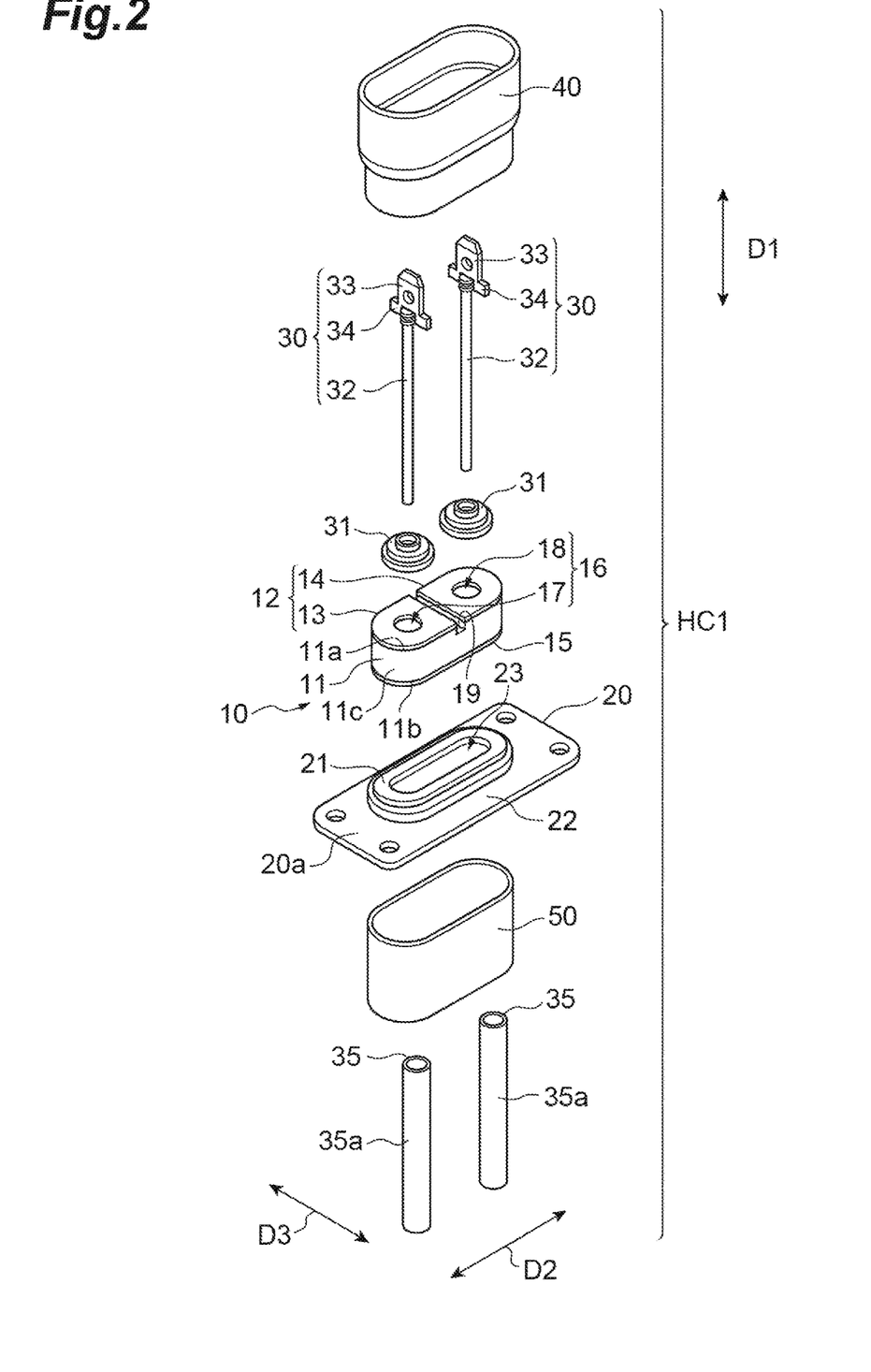
FIG. 2 is an exploded perspective view illustrating the high voltage feed-through capacitor according to the present embodiment.

A configuration of a high voltage feed-through capacitor HC1 will be described with reference to FIG. 1 and FIG. 2. The high voltage feed-through capacitor HC1 includes a feed-through capacitor unit 1. The feed-through capacitor unit 1 includes a feed-through capacitor 10, a terminal conductor 20, and a through conductor 30. The high voltage feed-through capacitor HC1 is connected to, for example, a magnetron provided in a microwave oven. The configuration in which the high voltage feed-through capacitor HC1 is connected to the magnetron prevents unnecessary radiation noise caused in the magnetron. The feed-through capacitor 10 functions as a filter preventing unnecessary radiation noise.

The feed-through capacitor unit 1 includes an element body 11. The element body 11 includes first and second principal surfaces 11a and 11b opposing each other. In the present embodiment, the first and second principal surfaces 11a and 11b oppose each other in a first direction D1. The first and second principal surfaces 11a and 11b define both end surfaces of the element body 11 in the first direction D1. The element body 11 includes a side wall surface 11c. The side wall surface 11c extends in the first direction D1 to couple the first and second principal surfaces 11a and 11b to each other. The side wall surface 11c defines the outer periphery of the element body 11 when viewed in the first direction D1. The element body 11 includes, for example, an insulating material. The element body 11 includes, for example, a ceramic. The ceramic included in the element body 11 includes, for example, $BaTiO_3$, $BaZrO_3$, $CaTiO_3$, or $MgTiO_3$. $BaTiO_3$, $BaZrO_3$, $CaTiO_3$, or $MgTiO_3$ is the main component of the ceramic included in the element body 11. The element body 11 may include an additive added to the ceramic. The additive includes, for example, Si, Mg, Zr, Zn, Y, V, Al, or Mn. Herein, the direction toward the first principal surface 11a from the second principal surface 11b is the upward direction. The first principal surface 11a is located above the second principal surface 11b.

The feed-through capacitor unit 1 includes a first electrode 12 and a second electrode 15. The first electrode 12 is formed on the first principal surface 11a. The second electrode 15 is formed on the second principal surface 11b. That is, the feed-through capacitor unit 1 includes the first electrode 12 on the first principal surface 11a and the second electrode 15 on the second principal surface 11b. The first electrode 12 includes, for example, a pair of conductors 13 and 14. The conductors 13 and 14 are separated from each other on the first principal surface 11a. In the present embodiment, the conductors 13 and 14 are separated from each other in a second direction D2 intersecting the first direction D1. The conductor 13 opposes the second electrode 15 in the first direction D1. The conductor 14 opposes the second electrode 15 in the first direction D1.

In the element body 11, a through hole 16 is formed. The through hole 16 is formed in the element body 1 to be open at the first and second principal surfaces 11a and 11b. The feed-through capacitor unit 1 includes a surface 1a, and the surface 1a includes an inner wall surface 16a defining the through hole 16. That is, the element body 11 includes the inner wall surface 16a. The surface 1a is exposed to the outside of the feed-through capacitor unit 1 in the state of the feed-through capacitor unit 1 alone. In the present embodiment, the through hole 16 includes two through holes 17 and 18. The inner wall surface 16a includes an inner wall surface 17a defining the through hole 17 and an inner wall surface 18a defining the through hole 18. The through hole 17 is formed in the element body 1 to be open at the first and second principal surfaces 11a and 11b. In the present embodiment, the through hole 17 penetrates the element body 11 between the first principal surface 11a and the second principal surface 11b in the first direction D1. The through hole 17 also penetrates, for example, the conductor 13 and the second electrode 15. The through hole 18 is formed in the element body 1 to be open at the first and second principal surfaces 11a and 11b. In the present embodiment, the through hole 18 penetrates the element body 11 between the first principal surface 11a and the second principal surface 11b in the first direction D1. The through hole 18 also penetrates, for example, the conductor 14 and the second electrode 15. The through hole 17 may not penetrate the conductor 13 and the second electrode 15. The through hole 18 may not penetrate the conductor 14 and the second electrode 15. The through holes 17 and 18 have, for example, a circular shape when viewed in the first direction D1.

The first and second electrodes 12 and 15 include, for example, a conductive metal material. The conductive metal material constituting the first and second electrodes 12 and 15 includes, for example, Ag. The first and second electrodes 12 and 15 may include, for example, a magnetic material in addition to the conductive metal material. The magnetic material includes, for example, Fe, Co, Ni, Cu, or Sr. The first and second electrodes 12 and 15 are formed, for example, by sintering a conductive paste applied to the first and second principal surfaces 11a and 11b of the element body 11. The conductive paste for forming the first and second electrodes 12 and 15 includes, for example, the above conductive metal material.

A groove 19 is formed in the element body 11. In the present embodiment, the groove 19 is formed between the conductors 13 and 14. No electrode is formed in the groove 19. The surface 1a includes a wall surface 19a defining the groove 19. That is, the element body 11 includes the wall surface 19a. The first principal surface 11a includes the wall surface 19a. The groove 19 extends, for example, in a third direction D3. The third direction D3 intersects the first direction D1 and the second direction D2. The groove 19 reaches, for example, both ends of the first principal surface 11a in the third direction D3. In the present embodiment, the first direction D1, the second direction D2, and the third direction D3 are orthogonal to each other.

The terminal conductor 20 is electrically connected to the second electrode 15. The terminal conductor 20 supports, for example, the feed-through capacitor 10. The terminal conductor 20 includes, for example, a protruding portion 21 and a peripheral portion 22. The peripheral portion 22 surrounds the protruding portion 21 when viewed in the first direction D1. The protruding portion 21 projects from the peripheral portion 22 toward the feed-through capacitor 10 when viewed in the second direction D2. An opening 23 is formed, for example, in the protruding portion 21. The opening 23 penetrates the protruding portion 21 in the first direction D1. The opening 23 is located, for example, in the central region of the protruding portion 21 when viewed in the first direction D1.

The feed-through capacitor 10 is disposed such that the second electrode 15 is electrically connected to the terminal conductor 20. In the present embodiment, the terminal conductor 20 supports the feed-through capacitor 10 such that the protruding portion 21 is in contact with the second electrode 15. The terminal conductor 20 is grounded, for example. The protruding portion 21 and the second electrode 15 are connected through, for example, solder. The terminal conductor 20 includes a surface 20a. The surface 1a includes the surface 20a. The surface 20a constitutes, for example, a conductor surface of the terminal conductor 20.

The terminal conductor 20 has, for example, a rectangular shape when viewed in the first direction D1. As used herein, the term "rectangular" includes, for example, a shape in which each corner is chamfered or a shape in which each corner is rounded. The terminal conductor 20 includes, for example, a conductive metal material. The conductive metal material constituting the terminal conductor 20 includes, for example, Fe, Cu, or a Cu—Zn alloy. The Cu—Zn alloy includes, for example, brass.

The through conductor 30 is inserted through the through hole 16 and electrically connected to the first electrode 12. In the present embodiment, the feed-through capacitor unit 1 includes first and second through conductors 30 and first and second electrode connectors 31. That is, the through conductor 30 includes the first and second through conductors 30. The electrode connectors 31 includes the first and second electrode connectors 31. Each of the first and second through conductors 30 includes a penetration portion 32, a tab portion 33, and a crimping joint 34. The penetration portion 32 includes a conductor. The penetration portion 32 has, for example, a cylindrical shape when viewed in the first direction D1. The tab portion 33 includes a tab connector. The crimping joint 34 electrically and physically connects the penetration portion 32 and the tab portion 33.

The first through conductor 30 is electrically connected to the conductor 13. The penetration portion 32 of the first through conductor 30 is inserted through the first electrode connector 31, the through hole 17, and the opening 23. The first electrode connector 31 is disposed between the tab portion 33 and the crimping joint 34 and the conductor 13. The first electrode connector 31 electrically connects the tab portion 33 and the crimping joint 34 with the conductor 13.

The second through conductor 30 is electrically connected to the conductor 14. The penetration portion 32 of the second through conductor 30 is inserted through the second electrode connector 31, the through hole 18, and the opening 23. The second electrode connector 31 is disposed between the tab portion 33 and the crimping joint 34 and the conductor 14. The second electrode connector 31 electrically connects the tab portion 33 and the crimping joint 34 with the conductor 14.

The feed-through capacitor unit 1 includes a coating material 35. The coating material 35 coats the through conductor 30 and has an electrical insulation property. The coating material 35 includes an outer surface 35a. The surface 1a includes the outer surface 35a. In the present embodiment, the feed-through capacitor unit 1 includes first and second coating materials 35. That is, the coating material 35 includes the first and second coating materials 35. The first coating material 35 coats a side surface of the first through conductor 30. The second coating material 35 coats a side surface of the second through conductor 30. The coating material 35 includes an insulating rubber. The insulating rubber constituting the coating material 35 includes, for example, silicone rubber.

In the present embodiment, the first through conductor 30 includes a region coated with the coating material 35 (first coating material 35). The above region of the first through conductor 30 is inserted through the through hole 17 and the opening 23. The second through conductor 30 includes a region coated with the coating material 35 (second coating material 35). The above region of the second through conductor 30 is inserted through the through hole 18 and the opening 23. The through conductor 30 includes, for example, a power supply terminal to the feed-through capacitor 10. In the configuration in which the high voltage feed-through capacitor HC1 is connected to, for example, a magnetron, the terminal conductor 20 is grounded and a high voltage is applied to the through conductor 30. The noise passing through the through conductor 30 is removed by the feed-through capacitor 10. The through conductor 30 includes, for example, a conductive metal material. The conductive metal material constituting the through conductor 30 includes, for example, Fe, Cu, or a Cu—Zn alloy. The Cu—Zn alloy includes, for example, brass.

The high voltage feed-through capacitor HC1 includes housings 40 and 50. The housings 40 and 50 have, for example, a hollow tubular shape. The housings 40 and 50 store, for example, the feed-through capacitor unit 1. The housing 40 is disposed such that the terminal conductor 20 is located between the housing 40 and the housing 50. The housing 40 is disposed above the housing 50. When viewed in the second direction D2 and the third direction D3, the housing 40 surrounds, for example, the protruding portion 21, the feed-through capacitor 10, the electrode connector 31, a part of the penetration portion 32, the crimping joint 34, and the tab portion 33. The above part of the penetration portion 32 is inserted into the through hole 16. The housing 40 is physically connected to the terminal conductor 20. The housing 40 is connected to the terminal conductor 20, for example, such that the inner surface of the housing 40 is in contact with the outer surface of the protruding portion 21. The inner surface of the housing 40 includes a region in contact with the outer surface of the protruding portion 21. The region in contact with the outer surface of the protruding portion 21 is located at the lower end of the housing 40. The lower end surface of the housing 40 is in contact with, for example, the upper surface of the peripheral portion 22.

The housing 50 is physically connected to the terminal conductor 20. When viewed in the second direction D2 and the third direction D3, the housing 50 surrounds, for example, a part of the through conductor 30. The above part of the through conductor 30 is not inserted into the through hole 16. The housing 50 is connected to the terminal conductor 20, for example, such that the outer surface of the housing 50 is in contact with the inner surface of the protruding portion 21. The outer surface of the housing 50 includes a region in contact with the inner surface of the protruding portion 21. The region in contact with the inner surface of the protruding portion 21 is located at the upper end of the housing 50.

The housings 40 and 50 include an insulating material. The housings 40 and 50 may include the same material. The insulating material constituting the housings 40 and 50 includes, for example, polybutylene terephthalate (PBT), polyethylene terephthalate (PET), or modified melamine. The insulating material constituting the housings 40 and 50 may include an inorganic substance. The inorganic substance included in the housings 40 and 50 includes, for example, glass powder and ceramic powder. The glass powder includes, for example, industrial glass powder. The ceramic powder includes, for example, $SiO_2$ powder, $Al_2O_3$ powder, talc ($Mg_3Si_4O_{10}(OH)_2$), aluminum nitride (AlN), or silicon nitride ($Si_3N_4$).

The high voltage feed-through capacitor HC1 includes a resin 2. The resin 2 coats the feed-through capacitor unit 1. The resin 2 coats the surface 1a of the feed-through capacitor unit 1. That is, the resin 2 seals the surface 1a of the feed-through capacitor unit 1. In the present embodiment, the resin 2 includes first and second resins 2. The inside of the housing 40 is filled with the first resin 2. That is, the first resin 2 is located on the inside of the housing 40. The first resin 2 coats the surface 1a. The first resin 2 is disposed between the housing 40 and a group including the feed-through capacitor 10, the electrode connector 31, the tab portion 33, the crimping joint 34, and the protruding portion 21. The first resin 2 fills the space between the housing 40 and the group including the feed-through capacitor 10, the electrode connector 31, the tab portion 33, the crimping joint 34, and the protruding portion 21. The first resin 2 coats the groove 19. The upper end edge of the first resin 2 reaches a height at which the crimping joint 34 is buried. That is, the distance from a reference plane to the upper end edge of the first resin 2 is larger than the distance from the reference plane to the upper end of the crimping joint 34. The reference plane includes, for example, a plane including the first principal surface 11a. The lower end edge of the first resin 2 reaches the protruding portion 21. Herein, among the both end edges of the resin 2 in the first direction D1, the end edge located above is the upper end edge, and the end edge located below is the lower end edge.

In the present embodiment, the inside of the housing 50 is also filled with the resin 2. That is, the second resin 2 is located on the inside of the housing 50. The second resin 2 coats the feed-through capacitor unit 1. The second resin 2 coats the surface 1a. The second resin 2 is disposed between the housing 50 and a group including the protruding portion 21, the inner wall surface 16a, and the coating material 35. The second resin 2 fills the space between the housing 50 and the group including the protruding portion 21, the inner wall surface 16a, and the coating material 35. The upper end edge of the second resin 2 reaches the lower surface of the electrode connector 31. The lower end edge of the second resin 2 is located, for example, below the lower surface of the peripheral portion 22. In FIG. 1, the hatching of the resin 2 is omitted.

The resin 2 includes an insulating material. The insulating material constituting the resin 2 includes, for example, a thermosetting resin. The thermosetting resin constituting the resin 2 includes, for example, a urethane resin, an epoxy resin, a phenol resin, or a silicone resin. The material included in the first resin 2 and the material included in the second resin 2 may be different from each other. Therefore, for example, the first resin 2 may include an epoxy resin, and the second resin 2 may include a silicone resin. The first resin 2 and the second resin 2 may include an epoxy resin.

In the present embodiment, a bond structure 5 is provided in the high voltage feed-through capacitor HC1. That is, the high voltage feed-through capacitor HC1 includes a bond structure 5. The bond structure 5 chemically bonds the surface 1a of the feed-through capacitor unit 1 and the surface 2a of the resin 2. The bond structure 5 is provided, for example, between the surface 1a and the surface 2a. The surface 1a is bonded to the surface 2a via the bond structure 5. The surface 2a is bonded to the surface 1a via the bond structure 5. For example, when the surface 1a constitutes the first surface, the surface 2a constitutes the second surface. The surface 2a may include the surface of the first resin 2 and the surface of the second resin 2.

The resin 2 (second resin 2) coats the inner wall surface 16a. The bond structure 5 chemically bonds the inner wall surface 16a and the surface 2a. The resin 2 (second resin 2) coats the outer surface 35a. The bond structure 5 chemically bonds the outer surface 35a and the surface 2a. The resin 2 (first resin 2) coats the surface 20a. The bond structure 5 chemically bonds the surface 20a and the surface 2a. The resin 2 (first resin 2) coats the wall surface 19a. The bond structure 5 chemically bonds the wall surface 19a and the surface 2a. The resin 2 (first resin 2) coats the side wall surface 11c included in the element body 11. The bond structure 5 chemically bonds the side wall surface 11c and the surface 2a. The surface 1a may include the side wall surface 11c. The resin 2 coats the first and second electrodes 12 and 15. The bond structure 5 chemically bonds the first and second electrodes 12 and 15 and the surface 2a. The surface 1a may include the surfaces of the first and second electrodes 12 and 15.

Figure 4:
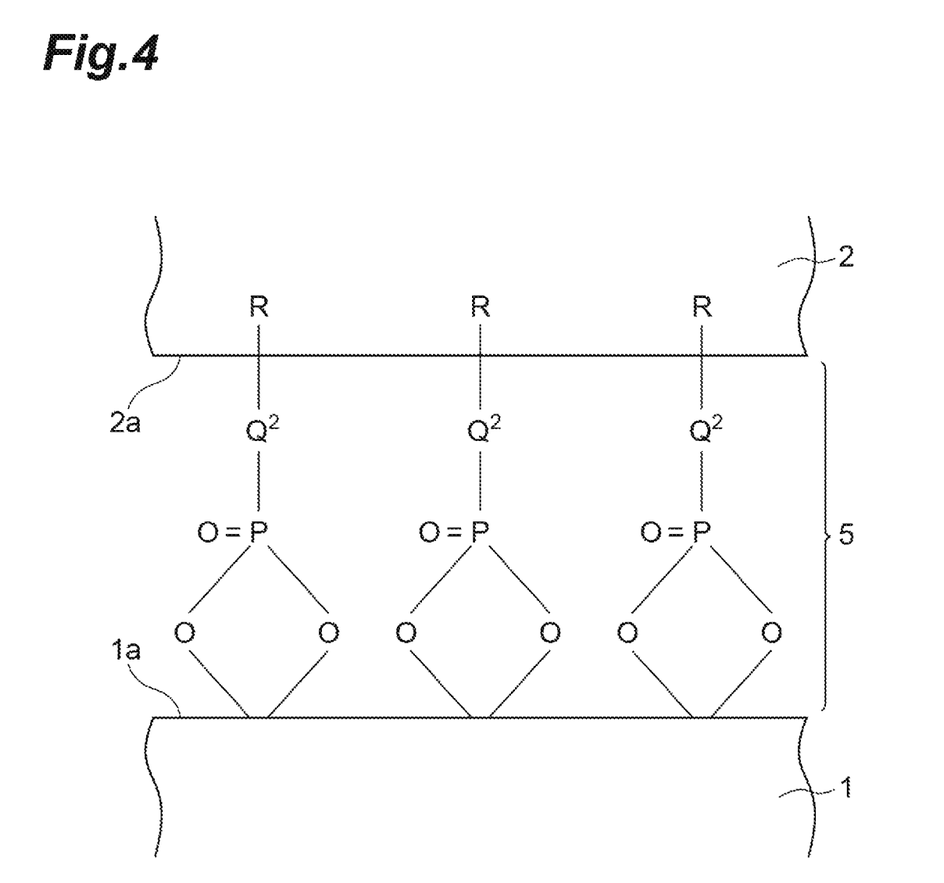
FIG. 4 is a diagram illustrating another example of the bond structure.
Figure 5:
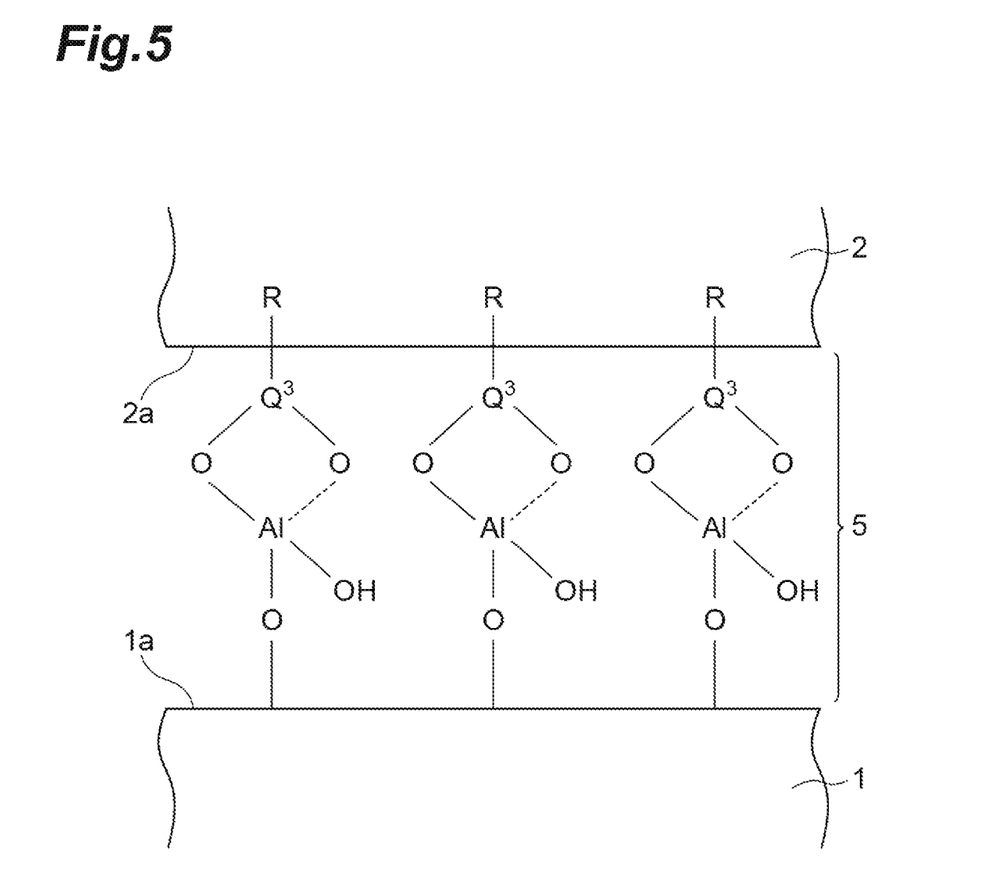
FIG. 5 is a diagram illustrating yet another example of the bond structure.

Hereinafter, the bond structure 5 will be described with reference to FIGS. 3 to 5. The bond structure 5 is chemically bonded to the surface 1a and is also chemically bonded to the surface 2a. As a result, the surface 1a and the surface 2a are chemically bonded with the bond structure 5. The bond structure 5 is made, for example, from at least one of a silane coupling agent, a phosphonic acid derivative, or a chelate complex. That is, the bond structure 5 may be made as follows. The bond structure 5 may be made, for example, from the silane coupling agent, the phosphonic acid derivative, and the chelate complex. The bond structure 5 may be made, for example, from the silane coupling agent and the phosphonic acid derivative. The bond structure 5 may be made, for example, from the phosphonic acid derivative and the chelate complex. The bond structure 5 may be made, for example, from the silane coupling agent and the chelate complex. Each bond illustrated in FIGS. 3 to 5 is one example of the chemical bond in the bond structure 5.

Figure 3:
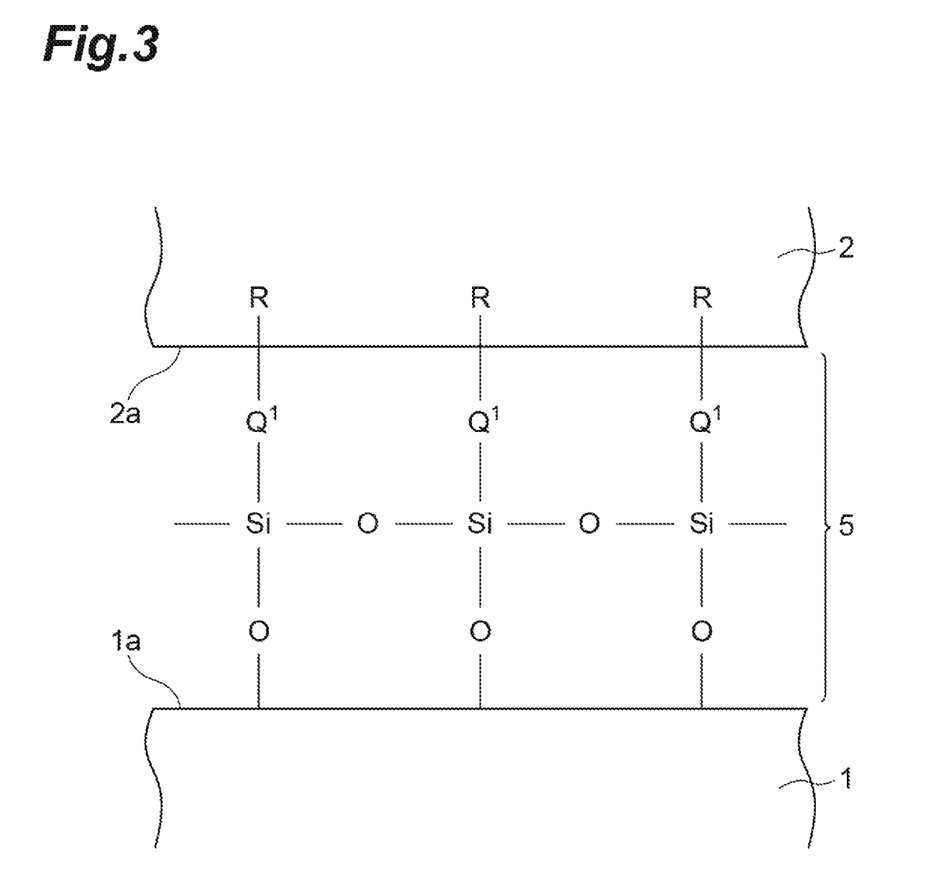
FIG. 3 is a diagram illustrating one example of a bond structure.

As illustrated in FIG. 3, the bond structure 5 made from a silane coupling agent includes a silicon (Si) atom. The silicon atom chemically bonds the surface 1a and the surface 2a. This silicon atom is derived from the silane coupling agent. The silane coupling agent has, for example, a chemical structure represented with chemical formula (1).

[Chemical Formula 1]

(1)

In chemical formula (1), the Y group includes, for example, an amino group, an epoxy group, a methacrylic group, a vinyl group, or a mercapto group. The $R^1$ group includes, for example, a $CH_3$ group or a $C_2H_5$ group. The $OR^2$ group includes, for example, an $OCH_3$ group, an $OC_2H_5$ group, or an $OCOCH_3$ group. In chemical formula (1), "n" is an integer of 0 to 2. "O" in the $OR^2$ group is an oxygen atom.

In the bond structure 5 made from a silane coupling agent, for example, the silicon atom derived from the silane coupling agent mixed into the resin 2 is chemically bonded to the surface 1a. After mixing the silane coupling agent into the resin 2, for example, the bond structure 5 is chemically bonded to the surface 1a. The chemical bond between the bond structure 5 and the surface 1a is generated, for example, through a hydrolysis treatment or a heat treatment of the silane coupling agent and the resin 2. The silane coupling agent mixed into the resin 2 is introduced between the surface 1a and the resin 2 through, for example, a hydrolysis treatment and a heat treatment. The silane coupling agent may be applied to the surface 1a. The silane coupling agent applied to the surface 1a is introduced between the surface 1a and the resin 2 through, for example, a hydrolysis treatment and a heat treatment. The $OR^2$ group of the silane coupling agent chemically reacts with, for example, a hydroxyl group present on the surface 1a. The chemical reaction between the $OR^2$ group of the silane coupling agent and the hydroxyl group present on the surface 1a is generated, for example, through a hydrolysis treatment or a heat treatment. The silicon atom derived from the silane coupling agent is covalently bonded to an oxygen atom on the surface 1a. This covalent bond is generated through the chemical reaction between the $OR^2$ group of the silane coupling agent and the hydroxyl group of the feed-through capacitor unit 1. The bond structure 5 includes a chemical bond between the surface 1a and the silicon atom derived from the silane coupling agent.

The chemical bond between the bond structure 5 and the surface 2a is generated, for example, through at least one of a chemical reaction or an intermolecular interaction between the Y group of the silane coupling agent and an atomic group constituting the resin 2. The chemical reaction between the Y group and the atomic group constituting the resin 2 is generated, for example, when the Y group includes an atomic group that chemically reacts with a molecule constituting the resin 2. For example, when the Y group includes a bulky atomic group, an intermolecular interaction is generated between the Y group and the atomic group constituting the resin 2. When the Y group includes a bulky atomic group, the steric hindrance of the Y group increases the distance between an atomic group having chemical reactivity of the silane coupling agent and an atomic group having chemical reactivity of the resin 2. For this reason, the silane coupling agent tends not to chemically react with the resin 2. The chemical bond between the bond structure 5 and the surface 2a tends to be governed by the above intermolecular interaction. In FIG. 3, "$Q^1$" represents an atomic group (a group) derived from the Y group, and "R" represents a moiety of a molecule constituting the surface 2a, for example, an atomic group derived from a reactive functional group. The chemical bond between a $Q^1$ group and an R group forms a chemical bond between the bond structure 5 and the surface 2a. The $Q^1$ group is covalently bonded to a silicon atom. As a result, the silicon atom derived from the silane coupling agent chemically bonds the bond structure 5 and the surface 2a. In the present embodiment, the Y group can be modified when the molecule constituting the resin 2 is changed. For example, when the resin 2 includes an epoxy resin, a silane coupling agent in which the Y group includes at least one of an amino group, an epoxy group, or a carbonyl group is used. In the chemical bond between the bond structure 5 and the surface 2a, the silicon atom derived from the silane coupling agent and the R group are, for example, directly covalently bonded. In this case, the bond structure 5 includes a chemical bond between the surface 2a and the silicon atom derived from the silane coupling agent. In the present embodiment, the bond structure 5 chemically bonds the surface 1a and the surface 2a via the silicon atom derived from the silane coupling agent.

The bond structure 5 may be made, for example, from coating the surface 1a to which the silane coupling agent is applied with the resin 2. The bond structure 5 may be made, for example, from coating the surface 1a with the resin 2 into which the silane coupling agent is mixed. In either case, after coating the surface 1a with the resin 2, the silane coupling agent and the resin 2 may be subjected to a chemical treatment and a heat treatment. In the present embodiment, the silane coupling agent from which the silicon atom is derived includes at least one of a silane coupling agent applied to the surface 1a or a silane coupling agent mixed into the resin 2.

As illustrated in FIG. 4, the bond structure 5 made from a phosphonic acid derivative includes a phosphorus (P) atom. The phosphorus atom chemically bonds the surface 1a and the surface 2a. This phosphorus atom is derived from the phosphonic acid derivative. The phosphonic acid derivative has, for example, a chemical structure represented with chemical formula (2).
[Chemical Formula 2]

In chemical formula (2), the $R^3$ group includes, for example, an alkyl group including a chain or cyclic carbon chain. At least one $OR^4$ group of the two $OR^4$ groups includes, for example, a hydroxyl group. "O" in the $OR^4$ group is an oxygen atom.

The bond structure 5 is made, for example, from subjecting the resin 2 into which the phosphonic acid derivative is mixed to a hydrolysis treatment and a heat treatment. The phosphonic acid derivative mixed into the resin 2 is introduced between the surface 1a and the resin 2 through, for example, a hydrolysis treatment and a heat treatment. The phosphonic acid derivative may be applied to the surface 1a. The phosphonic acid derivative applied to the surface 1a is introduced between the surface 1a and the resin 2 through, for example, a hydrolysis treatment and a heat treatment. The $OR^4$ group of the phosphonic acid derivative chemically reacts with a hydroxyl group present on the surface 1a through, for example, a hydrolysis treatment and a heat treatment. The hydroxyl group present on the surface 1a can also be produced, for example, with a proton supplied from the phosphonic acid derivative. Through a chemical reaction between the $OR^4$ group of the phosphonic acid derivative and the hydroxyl group of the feed-through capacitor unit 1, the phosphorus atom derived from the phosphonic acid derivative is covalently bonded to an oxygen atom present on the surface 1a. The bond structure 5 includes a chemical bond between the surface 1a and the phosphorus atom derived from the phosphonic acid derivative.

The chemical bond between the bond structure 5 and the surface 2a is generated, for example, through at least one of a chemical reaction or an intermolecular interaction between the $R^3$ group of the phosphonic acid derivative and an atomic group constituting the resin 2. The chemical reaction between the $R^3$ group and the atomic group constituting the resin 2 is generated, for example, when the $R^3$ group includes an atomic group that chemically reacts with an atomic group constituting the resin 2. For example, when the $R^3$ group includes a bulky atomic group, an intermolecular interaction is generated between the $R^3$ group and the atomic group constituting the resin 2. When the $R^3$ group includes a bulky atomic group, the steric hindrance of the $R^3$ group increases the distance between an atomic group having chemical reactivity of the phosphonic acid derivative and an atomic group having chemical reactivity of the resin 2. For this reason, the phosphonic acid derivative tends not to chemically react with the resin 2. The chemical bond between the bond structure 5 and the surface 2a tends to be governed through the above intermolecular interaction. In FIG. 4, "$Q^2$" represents an atomic group derived from the $R^3$ group, and "R" represents a moiety of a molecule constituting the surface 2a, for example, an atomic group derived from a reactive functional group. A $Q^2$ group and an R group are chemically bonded to each other to generate a chemical bond between the bond structure 5 and the surface 2a. The $Q^2$ group is covalently bonded to a phosphorus atom. As a result, the phosphorus atom derived from the phosphonic acid derivative chemically bonds the bond structure 5 and the surface 2a. In the chemical bond between the bond structure 5 and the surface 2a, the phosphorus atom derived from the phosphonic acid derivative and the R group are, for example, directly covalently bonded. In this case, the bond structure 5 includes a chemical bond between the surface 2a and the phosphorus atom derived from the phosphonic acid derivative. In the present embodiment, the bond structure 5 chemically bonds the surface 1a and the surface 2a via the phosphorus atom derived from the phosphonic acid derivative.

The bond structure 5 may be made, for example, from coating the surface 1a to which the phosphonic acid derivative is applied with the resin 2. The bond structure 5 may be made, for example, from coating the surface 1a with the resin 2 into which the phosphonic acid derivative is mixed. In either case, after coating the surface 1a with the 15 resin 2, the phosphonic acid derivative and the resin 2 may be subjected to a chemical treatment and a heat treatment. In the present embodiment, the phosphonic acid derivative from which the phosphorus atom is derived includes at least one of a phosphonic acid derivative applied to the surface 1a or a phosphonic acid derivative mixed into the resin 2.

As illustrated in FIG. 5, the bond structure 5 made from using a chelate complex includes a central metal atom. The central metal atom chemically bonds the surface 1a and the surface 2a. This central metal atom is derived from the chelate complex. The chelate complex has, for example, a chemical structure represented with chemical formula (3). In the chelate complex, a ligand is coordinated to the central metal atom. In chemical formula (3) and FIG. 5, the bond illustrated with the broken line represents a coordination bond.
[Chemical Formula 3]

In chemical formula (3), the $R^5$ group includes, for example, a $C(CH_3)CHC(OC_2H_5)$ group. The $OR^6$ group includes, for example, an $OC_3H_7$ group, and "O" in the $OR^6$ group is an oxygen atom. In chemical formula (3), the central metal atom is, for example, Al. The central metal atom may include a metal atom other than Al, for example, Co, Fe, or Ti.

The bond structure 5 is made, for example, from subjecting the resin 2 into which the chelate complex is mixed to a hydrolysis treatment and a heat treatment. The chelate complex mixed into the resin 2 is introduced between the surface 1a and the resin 2 through, for example, a hydrolysis treatment and a heat treatment. The chelate complex may be applied to the surface 1a. The chelate complex applied to the surface 1a is introduced between the surface 1a and the resin 2 through, for example, a hydrolysis treatment and a heat treatment. The $OR^6$ group of the chelate complex chemically reacts with, for example, a hydroxyl group present on the surface 1a through a hydrolysis treatment and a heat treatment. The central metal atom derived from the chelate complex is covalently bonded to an oxygen atom present on the surface 1a. This covalent bond is generated through a chemical reaction between the $OR^6$ group of the chelate complex and a hydroxyl group of the feed-through capacitor unit 1. The bond structure 5 includes a chemical bond between the surface 1a and the central metal atom derived from the chelate complex.

The chemical bond between the bond structure 5 and the surface 2a is generated, for example, through at least one of a chemical reaction or an intermolecular interaction between the $R^5$ group of the chelate complex and an atomic group constituting the resin 2. The chemical reaction between the $R^5$ group and the atomic group constituting the resin 2 is generated, for example, when the $R^5$ group includes an atomic group that chemically reacts with an atomic group constituting the resin 2. For example, when the $R^5$ group includes a bulky atomic group, an intermolecular interaction is generated between the $R^5$ group and the atomic group constituting the resin 2. When the $R^5$ group includes a bulky atomic group, the steric hindrance of the $R^5$ group increases the distance between an atomic group having chemical reactivity of the chelate complex and an atomic group having chemical reactivity of the resin 2. For this reason, the chelate complex tends not to chemically react with the resin 2. The chemical bond between the bond structure 5 and the surface 2a tends to be governed by the above intermolecular interaction. In FIG. 5, "$Q^3$" represents an atomic group derived from the $R^5$ group, and "R" represents a moiety of a molecule constituting the surface 2a, for example, an atomic group derived from a reactive functional group. The chemical bond between a $Q^3$ group and an R group forms a chemical bond between the bond structure 5 and the surface 2a. The $Q^3$ group is covalently bonded to a central metal atom. As a result, the central metal atom derived from the chelate complex chemically bonds the bond structure 5 and the surface 2a. In the chemical bond between the bond structure 5 and the surface 2a, the central metal atom derived from the chelate complex and the R group are, for example, directly covalently bonded. The bond structure 5 includes a chemical bond between the surface 2a and the central metal atom derived from the chelate complex. In the present embodiment, the bond structure 5 chemically bonds the surface 1a and the surface 2a via the central metal atom derived from the chelate complex.

The bond structure 5 may be made, for example, from coating the surface 1a to which the chelate complex is applied with the resin 2. The bond structure 5 may be made, for example, from coating the surface 1a with the resin 2 into which the chelate complex is mixed. In either case, after coating the surface 1a with the resin 2, the chelate complex and the resin 2 may be subjected to a chemical treatment and a heat treatment. In the present embodiment, the chelate complex from which the central metal atom is derived includes at least one of a chelate complex applied to the surface 1a or a chelate complex mixed into the resin 2.

As described above, the high voltage feed-through capacitor HC1 includes a feed-through capacitor unit 1, a resin 2 coating the feed-through capacitor unit 1, and a bond structure 5 between the feed-through capacitor unit 1 and the resin 2. The feed-through capacitor unit 1 includes an element body 11, first and second electrodes 12 and 15, a through conductor 30, and a terminal conductor 20. The element body 11 includes first and second principal surfaces 11a and 11b opposing each other. In the element body 11, a through hole 16 is formed in the element body 1 to be open at the first and second principal surfaces 11a and 11b. The first electrode 12 is disposed on the first principal surface 11a, and the second electrode 15 is disposed on the second principal surface 11b. The through conductor 30 is inserted through the through hole 16 and electrically connected to the first electrode 12. The terminal conductor 20 is electrically connected to the second electrode 15. The bond structure 5 chemically bonds the surface 1a of the feed-through capacitor unit 1 and the surface 2a of the resin 2.

In the high voltage feed-through capacitor HC1, the bond structure 5 chemically bonds the surface 1a and the surface 2a. The chemical bond in the bond structure 5 is stronger than, for example, the physical bond between the surface 1a and the surface 2a. The physical bond is realized, for example, through an anchor effect due to the roughness of the surface 1a. Therefore, the high voltage feed-through capacitor HC1 certainly realizes a strong bond between the feed-through capacitor unit 1 and the resin 2. As a result, the high voltage feed-through capacitor HC1 has even higher reliability.

In the present embodiment, the surface 1a includes an inner wall surface 16a included in the element body 11 and defining a through hole 16. The bond structure 5 chemically bonds the inner wall surface 16a and the surface 2a. Therefore, the bond between the inner wall surface 16a and the surface 2a is enhanced. As a result, the high voltage feed-through capacitor HC1 certainly realizes a strong bond between the inner wall surface 16a and the resin 2.

In the present embodiment, the feed-through capacitor unit 1 includes a coating material 35 coating the through conductor 30 and having an electrical insulation property. The surface 1a includes the outer surface 35a of the coating material 35. The bond structure 5 chemically bonds the outer surface 35a and the surface 2a. Therefore, the bond between the outer surface 35a and the surface 2a is enhanced. As a result, the high voltage feed-through capacitor HC1 certainly realizes a strong bond between the outer surface 35a and the resin 2.

In the present embodiment, the surface 1a includes the surface 20a. The bond structure 5 chemically bonds the surface 20a and the surface 2a. Therefore, the bond between the surface 20a and the surface 2a is enhanced. As a result, the high voltage feed-through capacitor HC1 certainly realizes a strong bond between the surface 20a and the resin 2.

In the present embodiment, the first electrode 12 includes a pair of conductors 13 and 14 separated from each other on the first principal surface 11a. In the element body 11, a groove 19 is formed between the pair of conductors 13 and 14. The surface 1a includes a wall surface 19a included in the element body 11 and defining the groove 19. The bond structure 5 chemically bonds the wall surface 19a and the surface 2a. Therefore, the bond between the wall surface 19a and the surface 2a is enhanced. As a result, the high voltage feed-through capacitor HC1 certainly realizes a strong bond between the wall surface 19a and the resin 2.

In the present embodiment, the bond structure 5 chemically bonds the surface 1a and the surface 2a via a silicon atom derived from a silane coupling agent. Therefore, the bond between the surface 1a and the surface 2a includes, for example, a covalent bond via a silicon atom. As a result, the high voltage feed-through capacitor HC1 more certainly realizes a strong bond between the feed-through capacitor unit 1 and the resin 2.

In the present embodiment, the silane coupling agent includes at least one of the silane coupling agent applied to the surface 1a or a silane coupling agent mixed into the resin 2. Therefore, the silicon atom derived from the silane coupling agent more certainly forms a chemical bond between the surface 1a and the surface 2a. As a result, the high voltage feed-through capacitor HC1 even more certainly realizes a strong bond between the feed-through capacitor unit 1 and the resin 2.

In the present embodiment, the bond structure 5 chemically bonds the surface 1a and the surface 2a via a phosphorus atom derived from a phosphonic acid derivative. Therefore, the bond between the surface 1a and the surface 2a includes, for example, a covalent bond via a phosphorus atom. As a result, the high voltage feed-through capacitor HC1 more certainly realizes a strong bond between the feed-through capacitor unit 1 and the resin 2.

In the present embodiment, the phosphonic acid derivative includes at least one of a phosphonic acid derivative applied to the surface 1a or a phosphonic acid derivative mixed into the resin 2. Therefore, the phosphorus atom derived from the phosphonic acid derivative more certainly forms a chemical bond between the surface 1a and the surface 2a. As a result, the high voltage feed-through capacitor HC1 even more certainly realizes a strong bond between the feed-through capacitor unit 1 and the resin 2.

In the present embodiment, the bond structure 5 chemically bonds the surface 1a and the surface 2a via a central metal atom derived from a chelate complex. Therefore, the bond between the surface 1a and the surface 2a includes, for example, a covalent bond via a central metal atom. As a result, the high voltage feed-through capacitor HC1 more certainly realizes a strong bond between the feed-through capacitor unit 1 and the resin 2.

In the present embodiment, the chelate complex includes at least one of a chelate complex applied to the surface 1a or a chelate complex mixed into the resin 2. Therefore, the central metal atom derived from the chelate complex more certainly forms a chemical bond between the surface 1a and the surface 2a. As a result, the high voltage feed-through capacitor HC1 even more certainly realizes a strong bond between the feed-through capacitor unit 1 and the resin 2.

Although the embodiment of the present invention has been described above, the present invention is not necessarily limited to the embodiment, and the embodiment can be variously changed without departing from the scope of the invention.

In the high voltage feed-through capacitor HC1, the bond structure 5 may not chemically bond the inner wall surface 16a and the surface 2a. The configuration in which the bond structure 5 chemically bonds the inner wall surface 16a and the surface 2a enhances the bond between the inner wall surface 16a and the surface 2a as described above. Therefore, the high voltage feed-through capacitor HC1 certainly realizes a strong bond between the inner wall surface 16a and the resin 2.

In the high voltage feed-through capacitor HC1, the bond structure 5 may not chemically bond the outer surface 35a and the surface 2a. The configuration in which the bond structure 5 chemically bonds the outer surface 35a and the surface 2a enhances the bond between the outer surface 35a and the surface 2a as described above. Therefore, the high voltage feed-through capacitor HC1 certainly realizes a strong bond between the outer surface 35a and the resin 2.

In the high voltage feed-through capacitor HC1, the bond structure 5 may not chemically bond the surface 20a and the surface 2a. The configuration in which the bond structure 5 chemically bonds the surface 20a and the surface 2a enhances the bond between the surface 20a and the surface 2a as described above. Therefore, the high voltage feed-through capacitor HC1 certainly realizes a strong bond between the surface 20a and the resin 2.

In the high voltage feed-through capacitor HC1, the bond structure 5 may not chemically bond the wall surface 19a and the surface 2a. The configuration in which the bond structure 5 chemically bonds the wall surface 19a and the surface 2a enhances the bond between the wall surface 19a and the surface 2a as described above. Therefore, the high voltage feed-through capacitor HC1 certainly realizes a strong bond between the wall surface 19a and the resin 2.

What is claimed is:

1. A high voltage feed-through capacitor, comprising:
   a feed-through capacitor unit;
   a resin coating the feed-through capacitor unit; and
   a bond structure between the feed-through capacitor unit and the resin, wherein
   the feed-through capacitor unit includes
     an element body including first and second principal surfaces opposing each other and being formed with a through hole to be open at the first and second principal surfaces; and
     a first electrode disposed on the first principal surface;
     a second electrode disposed on the second principal surface;
     a through conductor inserted through the through hole and electrically connected to the first electrode; and
     a terminal conductor electrically connected to the second electrode,
   wherein the bond structure chemically bonds a first surface of the feed-through capacitor unit and a second surface of the resin, and
   wherein the bond structure chemically bonds the first surface and the second surface via a silicon atom derived from a silane coupling agent.

2. The high voltage feed-through capacitor according to claim 1, wherein
   the first surface includes an inner wall surface included in the element body and defining the through hole.

3. The high voltage feed-through capacitor according to claim 1, wherein
   the feed-through capacitor unit further includes a coating material coating the through conductor and having an electrical insulation property,
   the first surface includes an outer surface of the coating material, and
   the bond structure chemically bonds the outer surface and the second surface.

4. The high voltage feed-through capacitor according to claim 1, wherein
   the first surface includes a conductor surface of the terminal conductor, and
   the bond structure chemically bonds the conductor surface and the second surface.

5. The high voltage feed-through capacitor according to claim 1, wherein
the first electrode includes a pair of conductors separated from each other on the first principal surface,
in the element body, a groove is formed between the pair of conductors,
the first surface includes a wall surface included in the element body and defining the groove, and
the bond structure chemically bonds the wall surface and the second surface.

6. The high voltage feed-through capacitor according to claim 1, wherein
the silane coupling agent includes at least one of a silane coupling agent applied to the first surface or a silane coupling agent mixed into the resin.

7. A high voltage feed-through capacitor, comprising:
a feed-through capacitor unit;
a resin coating the feed-through capacitor unit; and
a bond structure between the feed-through capacitor unit and the resin, wherein
the feed-through capacitor unit includes
an element body including first and second principal surfaces opposing each other and being formed with a through hole to be open at the first and second principal surfaces; and
a first electrode disposed on the first principal surface;
a second electrode disposed on the second principal surface;
a through conductor inserted through the through hole and electrically connected to the first electrode; and
a terminal conductor electrically connected to the second electrode,
wherein the bond structure chemically bonds a first surface of the feed-through capacitor unit and a second surface of the resin, and
wherein the bond structure chemically bonds the first surface and the second surface via a phosphorus atom derived from a phosphonic acid derivative.

8. The high voltage feed-through capacitor according to claim 7, wherein
the first surface includes an inner wall surface included in the element body and defining the through hole.

9. The high voltage feed-through capacitor according to claim 7, wherein
the feed-through capacitor unit further includes a coating material coating the through conductor and having an electrical insulation property,
the first surface includes an outer surface of the coating material, and
the bond structure chemically bonds the outer surface and the second surface.

10. The high voltage feed-through capacitor according to claim 7, wherein
the first surface includes a conductor surface of the terminal conductor, and
the bond structure chemically bonds the conductor surface and the second surface.

11. The high voltage feed-through capacitor according to claim 7, wherein
the first electrode includes a pair of conductors separated from each other on the first principal surface,
in the element body, a groove is formed between the pair of conductors,
the first surface includes a wall surface included in the element body and defining the groove, and
the bond structure chemically bonds the wall surface and the second surface.

12. The high voltage feed-through capacitor according to claim 7, wherein
the phosphonic acid derivative includes at least one of a phosphonic acid derivative applied to the first surface or a phosphonic acid derivative mixed into the resin.

13. A high voltage feed-through capacitor, comprising:
a feed-through capacitor unit;
a resin coating the feed-through capacitor unit; and
a bond structure between the feed-through capacitor unit and the resin, wherein
the feed-through capacitor unit includes
an element body including first and second principal surfaces opposing each other and being formed with a through hole to be open at the first and second principal surfaces; and
a first electrode disposed on the first principal surface;
a second electrode disposed on the second principal surface;
a through conductor inserted through the through hole and electrically connected to the first electrode; and
a terminal conductor electrically connected to the second electrode,
wherein the bond structure chemically bonds a first surface of the feed-through capacitor unit and a second surface of the resin, and
wherein the bond structure chemically bonds the first surface and the second surface via a central metal atom derived from a chelate complex.

14. The high voltage feed-through capacitor according to claim 13, wherein
the first surface includes an inner wall surface included in the element body and defining the through hole.

15. The high voltage feed-through capacitor according to claim 13, wherein
the feed-through capacitor unit further includes a coating material coating the through conductor and having an electrical insulation property,
the first surface includes an outer surface of the coating material, and
the bond structure chemically bonds the outer surface and the second surface.

16. The high voltage feed-through capacitor according to claim 13, wherein
the first surface includes a conductor surface of the terminal conductor, and
the bond structure chemically bonds the conductor surface and the second surface.

17. The high voltage feed-through capacitor according to claim 13, wherein
the first electrode includes a pair of conductors separated from each other on the first principal surface,
in the element body, a groove is formed between the pair of conductors,
the first surface includes a wall surface included in the element body and defining the groove, and
the bond structure chemically bonds the wall surface and the second surface.

18. The high voltage feed-through capacitor according to claim 13, wherein
the chelate complex includes at least one of a chelate complex applied to the first surface or a chelate complex mixed into the resin.

* * * * *